United States Patent [19]

Ashby et al.

[11] 4,213,866
[45] Jul. 22, 1980

[54] COMPOSITION AND PROCESS FOR REMOVING SULFUR SCALE FROM INTERSTICES IN PETROLEUM BEARING FORMATIONS AND THE LIKE TO IMPROVE THE FLOW OF PETROLEUM

[76] Inventors: Robert M. Ashby, 3845 Fairmeade Rd., Pasadena, Calif. 91107; Frederick S. Kaveggia, 24772 Via San Felipe, Mission Viejo, Calif. 92675

[21] Appl. No.: 957,537

[22] Filed: Nov. 3, 1978

Related U.S. Application Data

[63] Continuation of Ser. No. 793,150, May 2, 1977, abandoned, which is a continuation-in-part of Ser. No. 536,336, Dec. 26, 1974, abandoned.

[51] Int. Cl.$^2$ ............................................. E21B 43/27
[52] U.S. Cl. ............................... 252/8.55 C; 166/307; 252/8.55 B; 252/80
[58] Field of Search ..................... 166/307; 423/68; 252/8.55 D, 8.55 C, 8.55 B, 80, 147

[56] References Cited

U.S. PATENT DOCUMENTS

| | | | |
|---|---|---|---|
| 2,128,161 | 8/1938 | Morgan | 252/8.55 |
| 2,175,095 | 10/1939 | Stoesser | 252/8.55 |
| 3,057,798 | 10/1962 | Knox | 252/8.55 |
| 3,131,993 | 5/1964 | Gustison et al. | 423/68 X |
| 3,657,003 | 4/1972 | Kenny | 252/313 X |
| 3,684,720 | 8/1972 | Richardson | 252/8.55 X |
| 3,826,312 | 7/1974 | Richardson et al. | 166/307 |
| 3,846,311 | 11/1974 | Sharp et al. | 252/8.55 |

*Primary Examiner*—Herbert B. Guynn
*Attorney, Agent, or Firm*—Christie, Parker & Hale

[57] ABSTRACT

Petroleum values bound in formations by sulfur scale blocked passages are freed by effectively dissolving the scale and formation rock with a solution containing a primary acid, a catalyst, and, preferably, a chelating or sequestering agent and a wetting agent. The primary acid is preferably hydrochloric. The catalyst is tetravalent or pentavalent vanadium. The chelating agent is at least one member selected from the class consisting of dicarboxylic acid, or tricarboxylic acid, or both acids, and glycerine, wherein the above acid group is always present. The primary acid attacks the sulfur scale and formation rock, and its action is substantially completed because of the catalyst. The chelating or sequestering agent maintains the dissolved minerals in solution. The wetting agent enables mineral penetration.

29 Claims, No Drawings

COMPOSITION AND PROCESS FOR REMOVING SULFUR SCALE FROM INTERSTICES IN PETROLEUM BEARING FORMATIONS AND THE LIKE TO IMPROVE THE FLOW OF PETROLEUM

CROSS-REFERENCE TO RELATED APPLICATION

This is a continuation of application Ser. No. 793,150, filed May 2, 1977, now abandoned, which in turn was a continuation-in-part application of application Ser. No. 536,336, filed Dec. 26, 1974, now abandoned.

BACKGROUND OF THE INVENTION

The present invention relates in general to the art of petroleum recovery and processing, and in particular, to a composition and process for its use to dissolve sulfur scale and render passages open for gas and oil recovery.

Subterranean formations containing oil and natural gas (or either) are susceptible to treatment to improve the recovery rate and total amount recovered of these values. Increasing the permeability of a formation containing the sought after value can increase the ability of the value to flow to a well. Enhanced permeability may release values from a formation itself, or improve or obtain a flow path to pockets and the like of the value. Thus, improving existing channeling and fissuring of a formation can improve recovery. Obviously, the creation of new fissures and channels has the same effect. Increasing the effective diameter of a well in the zone of a formation containing the value also increases recovery by reducing the resistance of flow to a well. Formation treatment to increase recovery both in amount and rate has included steam pushing, hydraulic, explosive, acid treatment, and combinations of these.

Sulfur scale quite often builds up in the interstices of formations serving as petroleum passages. The build-up can block petroleum flow in time. Sulfur scale is a broad term covering many different sulfur-containing substances.

While many formations are amenable to relatively easy treatment to increase natural gas and oil value recovery and production rates, when they become bound by sulfur scale, treatment has often proved impossible.

Sulfur scale appears in a wide variety of formations. One formation that it appears in is dolomite. Dolomite is a heterogeneous, variable composition of magnesium carbonate ($MgCO_3$), a calcium carbonate ($CaCO_3$), calcium magnesium carbonate, $CaMg(CO_3)_2$, a complex of magnesium carbonate and calcium carbonate, and other constituents such as magnesium oxide, silicates, complex aluminum oxides, iron oxides, and various metallic salts.

A known method of improving carbonaceous recovery and production rate in dolomite has been by hydrochloric acid (HCl) with salts of copper or arsenic as inhibitors. While hydrochloric acid dissolves a good percentage of the carbonates of the dolomite, a significant undissolved quantity of carbonate remains despite the fact that each carbonate by itself is essentially completely soluble in the acid. Moreover, at least the silicates of dolomite are not effectively dissolved by the acid. Hydrochloric acid intensified with hydrofluoric acid (HF) does not significantly improve dissolution over hydrochloric acid alone. The use of such acids as sulfuric acid on dolomite have not proved effective either. Sulfuric acid dissolves the magnesium carbonate constituent but produces the insoluble salt calcium sulfate as a precipitate, which again inhibits the treatment, often to the point of rendering the treatment of little or no benefit. It is now through that sulfur scale shields dolomite from attack and that this shielding largely accounts for the undissolved fraction of dolomite in the hydrochloric acid system.

It is not only in the improvement of permeability in the formations for the flow of oil and gas which presents a problem, but it is also in drilling. For example, dolomite is a tough material and it is difficult to drill through; it might appear in zones above the petroleum bearing zones and must be penetrated during the drilling process.

It is known that corrosion inhibitors may be required to protect drill string and well casing during acid treatment.

SUMMARY OF THE INVENTION

The present invention provides an improved composition and process for its utilization for beneficially treating passages through which petroleum values are to flow by reducing sulfur scaling of the passages. The invention improves the flow of carbonaceous values by opening up the passages.

The present invention envisions a composition of a primary acid, a vanadium catalyst chosen from the class consisting of tetravalent or pentavalent compounds, and, for most applications a secondary acid selected from one or more members of the class consisting of monocarboxylic acids, dicarboxylic acids, tricarboxylic acids and tetracarboxylic acids, and a wetting agent. Monocarboxylic acids include formic acid, acetic acid and derivatives of acetic. Dicarboxylic acid includes such acids as hydroxymalonic acid, dihydroxymalonic acid, malonic acid, and oxalic acid. Tricarboxylic acid includes citric acid. Tetracarboxylic acid includes ethylene-diamine-tetraacetic acid, often abbreviated as E.D.T.A.

It has been found that the composition of the present invention effectively dissolves sulfur scale and particularly well at the temperatures encountered at typical well depths.

By way of example, when formation material is to be dissolved and the formation is dolomite, the primary acid must react with the carbonates of the dolomite to form soluble magnesium and calcium salts. An example of such an acid and the preferred acid of this invention is hydrochloric acid. Hydrochloric acid forms the soluble salts magnesium chloride and calcium chloride and magnesium bicarbonate ($Mg(HCO_3)_2$) and calcium bicarbonate ($Ca(HCO_3)_2$) upon reaction with the carbonates of the dolomite. Hydrochloric acid with vanadium ions present also dissolves shielding sulfur scale and to some beneficial extent other formation components which could act as shields or stabilizers preventing sufficient dissolution of the carbonates. This acid is preferred because it is more economical to use that other shields. For the protection of drill string and well components suitable inhibitors may be employed. These inhibitors include copper and arsenic salts, and thiourea. Inhibitors are not as necessary with phosphoric acid, another suitable primary acid. While not critical, the pH of the acid system is less than 7 and preferably no more than about 3 to promote high reaction rate.

While for use with, for example, dolomite the primary acid must form soluble salts of magnesium and calcium, it has been found that because of some mechanism totally effective dissolution of carbonates with a primary acid as the only other starting reagent does not occur. It is believed that the sulfur scale blocks such dissolution and does not itself go into solution at a commercially acceptable rate when only the primary acid is used.

It has been discovered that the presence in minute amounts of a vanadium compound in the primary acid results in removal of sulfur scale and a solution which essentially completely dissolves some formations. This action is believed to be enhanced by minor amounts of a dicarboxylic, tricarboxylic, or tetracarboxylic acid, especially hydroxymalonic acid. Because of the greater rate of reaction than with other vanadium compounds, tetravalent and pentavalent vanadium are preferred. It is believed that the vanadium acts as a catalyst to promote a substantially greater reaction rate of sulfur scale and formation constituents with the primary acid than would be the case without its use. Additionally, it is preferred to use hydroxymalonic acid in the system for its promotion of more complete solution. Hydroxymalonic acid and glycerine promote even more complete solution. It is thought that these substances act as chelating or sequestering agents, even though this function is not well known for them. Other agents instead of glycerine have proved only partially satisfactory. Other examples of secondary acids that improve solution power include malonic acid, dihydroxymalonic acid, oxalic acid, citric acid and ethylene-diamine-tetraacetic acid.

The use of a wetting agent promotes penetration of the mineral and more rapid and perhaps more complete dissolution of the mineral. The wetting agent should be stable in acid and at the temperatures of reaction, say about 175° C.

These and other features, aspects and advantages of the present invention will become more apparent from the following description, examples, and appended claims.

DESCRIPTION OF THE PREFERRED EMBODIMENTS

EXAMPLE I

A sulfur scale contaminated dolomite was subjected to a test in a bomb. The dolomite was from a petroleum formation and had substantial organic based sulfur scale on it. It had other contaminants such as possibly drilling mud. The dolomite represented downhole conditions of a typical petroleum well. The bomb simulated the temperature and pressure conditions typically encountered in carbonaceous formation, about 175° C. and nine to ten atmospheres. Excluding scale and any other contaminants, the dolomite had the following composition by weight:

A. Carbonates ... about 89% ($CaCO_3$, $MgCO_3$ and $Ca(MgCO_3)_2$)
B. Aluminum oxide complex ... about 2 to 3% ($Al_2O_3)_4SiO_2.H_2O$
C. Magnesium oxide (Mg), ferrous iron and metallic salts ... about 2 to 3%
D. Silicates

| | |
|---|---|
| ($SiO_4$)---- | 0.7% |
| ($Si_4O_9$)-- | 0.1% |
| ($Si_2O_3$)-- | 2.0% |
| ($Si_3O_8$)---- | 0.3% |
| | about 3% |

In the remaining Examples of this application the percentages given are all in terms of the dolomite without contaminants.

The samples of this composition were subjected to hydrochloric acid alone in a bomb at the temperature and pressure indicated for a period of time of four hours to three days. The hydrochloric acid was 30% technical grade in a water solution of 5% of acid by weight.

Upon analysis, between from about 40 to about 60% by weight of the carbonates of the dolomite were in solution. The percentage by weight of the undissolved residue represented by carbonates was about 43%. The residue had significantly higher percentages of silicates than the percentage of silicates in the starting material, namely:

($SiO_4$)---- ... 2.0%
($Si_4O_9$)-- ... 0.5%
($Si_2O_3$)-- ... 8.0%
($Si_3O_3$) ... 1.5%

EXAMPLE II

Dolomite samples of the composition of Example I were subjected in a bomb at 175° C. at nine to ten atmospheres pressure to the following solution (by weight percent):

Vanadium pentoxide ($V_2O_5$) ... 0.01%
Hydroxymalonic acid: ($HOOC.CHOH.COOH.2-H_2O$) ... 0.3 to 0.5%
Glycerine ($CH_2OH.CHOH.CH_2OH$) ... 0.3 to 0.5%
Thiourea corrosion inhibitor ... 0.1 to 2%
Wetting agent (FC 95, a fluorocarbon) ... 0.01%
Hydrochloric acid (5% by weight HCl in water, 30% technical grade HCl) ... balance The solution had a pH of less than 3. The dolomite was essentially completely in a colloidal solution after a time of about four hours.

EXAMPLE III

Dolomite of the composition of Example I was subjected to the solution and test conditions of Example II except that phosphoric acid (100% technical grade) was used as a primary acid. The dolomite was essentially completely in colloidal solution after about four hours.

EXAMPLE IV

Dolomite of the composition of Example I was subjected to the solution and test conditions of Example II except that oxalic acid (COOHCOOH) was substituted for HCl. The oxalic was in powder form and 100% technical grade. The pH was not as low as with HCl. The dolomite was essentially completely in colloidal solution after about four hours.

EXAMPLE V

Dolomite of the composition of Example I was subjected to the solution and test conditions of Example II except that formic acid was substituted for HCl. The formic acid was 100% technical grade. The pH was not as low as with HCl. The dolomite was essentially completely in colloidal solution after about four hours.

EXAMPLE VI

Dolomite of the composition of Example I was subjected to the solution and test conditions of Example II except that 100% technical grade citric acid was substituted for HCl. The pH was not as low as with HCl. The dolomite was essentially completely in colloidal solution after about four hours.

EXAMPLE VII

Dolomite of the composition of Example I was subjected to the solution and test conditions of Example II except that the hydrochloric acid was intensified by hydrofluoric acid (HF), the solution being ½% HF and 5% HCl (both 30% technical grade). The pH was below 3. The dolomite was essentially completely in colloidal solution after about four hours. Corrosion of the bomb was noted.

EXAMPLE VIII

Dolomite of the composition of Example I was subjected to the solution and test conditions of Example II except that "18-Crown-6" compound (1,4,7,10,13,16 hexaoxalic 10 octadecane) was used in place of glycerine in one test and E.D.T.A. (ethylene-diamine-tetraacetic acid) in another test. Each of the substituted solutions had about a 5% undissolved residue. The balance of the dolomite was in colloidal solution. This result might be useful in some cases.

EXAMPLE IX

Various inhibitors were tried in place of thiourea in the solution of Example II and the solutions thus constituted were tried on the dolomite of Example I under the Example II test conditions. The inhibitors were cupric chloride, cupric nitrate, arsenic salts, and thiourea derivatives or related compounds, such as dimethyl thiourea, diethyl thiourea and dibutyl thiourea. These inhibitors did not adversely affect the quality of the reaction.

EXAMPLE X

The examples of II through VII were repeated omitting the vanadium. Only about 50% of the dolomite was dissolved with the balance being in a slurry.

EXAMPLE XI

The examples of II through VII were repeated omitting the hydroxymalonic acid. About 70% of the dolomite was dissolved with the balance being in a slurry.

EXAMPLE XII

The examples of II through VII were repeated omitting glycerine. About 90% of the dolomite was dissolved with the balance being in a slurry.

EXAMPLE XIII

The examples of II through VII were repeated except that vanadium sulfate replaced $V_2O_5$. The results were essentially the same.

EXAMPLE XIV

The examples of II through VII were repeated except that dihydroxymalonic acid ($HOOC.C(OH)_2.COOH.2H_2O$) was substituted for hydroxymalonic acid. About 85% of the dolomite was dissolved with the balance being in a slurry. (The dihydroxymalonic acid was about 50% as effective as hydroxymalonic acid.)

EXAMPLE XV

The examples of II through VII were repeated except that malonic acid ($HOOC.CH_2.COOH.2H_2O$) was substituted for hydroxymalonic acid. About 85% of the dolomite was dissolved with the balance being in a slurry. (The malonic acid was about 50% as effective as hydroxymalonic acid.)

EXAMPLE XVI

A petroleum well in Louisiana in a dolomite formation was acidified with hydrochloric acid and no improvement in petroleum recovery was noted during about a month's time. The well was then treated with 8,000 gallons of a solution of hydrochloric acid, vanadium pentoxide, hydroxymalonic acid, and glycerine. The solution in weight percent was:

Vanadium pentoxide . . . 0.2%
Hydroxymalonic acid . . . 0.1%
Glycerine . . . 0.125%
Hydrochloric acid (5% by weight HCl in water, 30% technical grade HCl) . . . balance After treatment, the well began to produce at commercially acceptable rates. The solution after treatment was heavy in sulfur and from this it was concluded that the well had been bound by sulfur scale.

EXAMPLE XVII

A petroleum well in Texas in a non-dolomitic formation was treated with 8,000 gallons of a solution of Example XVI on two successive occasions ten days apart. The first treatment improved the flow rate from the well marginally. After the second treatment, the flow rate improved materially. The first treatment showed signs of breaking up sulfur scale. The second treatment showed signs of materially removing sulfur scale. The effluent of treatment tested heavily in sulfur.

EXAMPLE XVIII

A petroleum well in Long Beach, Calif. was injected with 8,000 gallons of the solution of Example XVI. The product of the treatment showed heavy in sulfur again indicating the presence of sulfur scale in the formation. The well produced better after treatment than before, but there was not as great an improvement as there was in Examples XVI and XVII. It is suspected that a low downhole temperature meant low reaction rates.

EXAMPLE XIX

The passages of petroleum refining equipment were plugged with sulfur scale. The passages were unblocked and the equipment made fully operational by the use of an aqueous solution of 3 weight percent hydrochloric acid and 0.6 weight percent vanadium pentoxide and a suitable corrosion inhibitor.

It is believed that a major mechanism in the improvement dissolution of the formation was the dissolution of sulfur scale protecting the rock plugging flow channels and that this allowed the primary acid to attack all the carbonates of the rock. In the case of dolomite these carbonates are calcium carbonate ($CaCO_3$), magnesium carbonate ($MgCO_3$), and a complex of these two carbonates, calcium magnesium carbonate ($Ca(MgCO_3)_2$). While the primary acid accounts for a major amount of carbonates dissolved, about fifty to sixty percent in the case of hydrochloric acid, it is an amount insufficient to release economical quantities of natural gas, petroleum, or both, at least in many instances. Theoretically, the carbonates are essentially completely soluble in the primary acid. The departure between theory and observed phenomena is thought to be the result of mechanical shielding by sulfur scale and possible other constituents. Besides the sulfur scale, the inhibiting constituents are thought to include silicates and aluminates of the rock. The sulfur scale is organic material of variable composition and is found in petroleum deposits, whether dolomitic or otherwise. Because of this it is thought that the solution has utility in dissolving sulfur scale from other formations in which petroleum values occur, such as slate, because such formations may resist dissolution for the same reason as dolomite or even in petroleum processing equipment.

While in many applications it is thought that the removal of sulfur scale alone will improve formation permeability to the point where petroleum values flow at commercially improved rates, the formation rock also will inevitably be dissolved and this must improve permeability.

For effective solution, it has been found necessary to add small amounts of vanadium compounds. The action of these constituents of the composition of the present invention is believed to be catalytic because of the extremely small quantities of the constituents required and their uncombined presence in the final solution. However, some chemical reaction with these constituents is possible.

Even though not normally associated with the substances, the dicarboxylic acids, tricarboxylic acids, tetracarboxylic acids, and glycerine appear to act as chelating or sequestering agents to keep complexes such as the silicates in solution. Other chelating agents, such as "Crown" compound, are effective if a small formation residue is tolerable.

The pre-reaction solution of the invention is definitely acidic. The pH is preferably three or less. While a more neutral acidic soluton, say pH 6, will essentially completely dissolve the carbonate, the stronger solution is preferred to improve solution rate. Naturally, the use of organic acids limits pre-reaction solution pH. Solution strength may also be limited by corrosion prevention requirements.

In formations such as dolomite, the primary acid must dissolve the magnesium and calcium salts of the rock. The acid should be economical. These requirements are met by hydrochloric acid. Phosphoric acid ($H_3PO_4$) is effective and has the advantage that it supplies its own inhibition against drill string and well component corrosion. Formic acid does not materially attack drill string and well components. However, phosphoric, formic, oxalic, and citric acids are more expensive than HCl. Any of the aforementioned acids may be intensified with hydrofluoric acid. Sulfuric acid will not work because it produces the insoluble precipitate calcium sulfate.

The preferred vanadium catalysts are pentavalent and tetravalent vanadium. Vanadium pentoxide ($V_2O_5$) is highly satisfactory and preferred because of cost. Vanadyl sulfate ($VOSO_4$) is also very effective, but not quite as economical as the pentoxide. Other vanadyls such as vanadyl chloride ($VOCl_2$) and vanadyl phosphate ($VOPO_4$) also work.

Corrosion inhibition of drill string and well components can be effected by such well known inhibitors as the cupric salts, cupric chloride ($CuCl_2$), cupric nitrate ($Cu(NO_3)_2$), chloride and nitrate arsenic salts, and thiourea and its derivates.

A wetting agent definitely enhances the reaction. It is thought that the wetting agent enables greater mineral penetration by the active reagents and therefore provides faster and more complete solution of dolomite. A suitable wetting agent is, for example, FC 95, a fluorocarbon. The agent must be stable in an acid and at the temperatures of reaction, say 175° C.

In drilling applications, the solution of the invention is merely added to the drilling hole, typically in the acid type drilling mud, to improve drilling rate. To improve recovery, the solution of the invention is merely pumped into a formation.

The present invention has been described with reference to a certain preferred embodiment and examples. The spirit and scope of the appended claims should not, however, necessarily be limited to the foregoing description.

What is claimed is:

1. A composition suitable for the essentially complete dissolution of sulfur scale from petroleum passages comprising:
    (a) an aqueous acidic solution of a primary acid selected from the class consisting of hydrochloric acid, phosphoric acid, formic acid, citric acid, oxalic acid, and any of said acids intensified with hydrofluoric acid;
    (b) minor amounts of a vanadium compound selected from at least one member of the class consisting of vanadium pentoxide, vanadyl sulfate, vanadyl chloride and vanadyl phosphate, the vanadium compound being present in the amount of at least about 0.01 weight percent;
    (c) minor amounts of a second acid selected from at least one member of the class consisting of acetic acid, hydroxymalonic acid, dihydroxymalonic acid, malonic acid, and ethylene-diamine-tetraacetic acid; and
    (d) the second acid being present in the composition in the amount of at least about 0.5 weight percent.

2. The composition claimed in claim 1 wherein the vanadium compound is selected from at least one member of the class consisting of vanadium pentoxide and vanadyl sulfate.

3. The composition claimed in claim 2 wherein: the solution has a maximum pH of about 3.

4. The composition claimed in claim 3 including a minor amount of glycerine, the glycerine being present in the composition in the amount of at least about 0.5 weight percent.

5. The composition claimed in claim 3 wherein the second acid is selected from at least one member of the class consisting of hydroxymalonic acid, dihydroxymalonic acid, and malonic acid.

6. The composition claimed in claim 5 including a minor amount of glycerine, the glycerine being present in the composition in the amount of at least about 0.5 weight percent.

7. The composition claimed in claim 5 wherein the second acid is hydroxymalonic acid.

8. The composition claimed in claim 6 wherein the second acid is hydroxymalonic acid.

9. The composition claimed in claim 4 including effective amounts of a wetting agent.

10. The composition claimed in claim 7 wherein the primary acid is hydrochloric acid.

11. The composition claimed in claim 1 including effective amounts of a corrosion inhibitor.

12. A composition suitable for the essentially complete dissolution of sulfur scale on petroleum bearing formations, such as dolomite, and petroleum handling equipment, comprising:
- (a) an aqueous solution of a primary acid selected from the group consisting of hydrochloric acid and hydrochloric acid intensified with hydrofluoric acid;
- (b) minor amounts of a second acid, the second acid being selected from the group consisting of hydroxymalonic acid, dihydroxymalonic acid, malonic acid, oxalic acid, citric acid, and ethylene-diamine-tetraacetic acid;
- (c) minor amounts of a vanadium compound selected from at least one member of the class consisting of vanadium pentoxide, vanadyl sulfate, vanadyl chloride and vanadyl phosphate;
- (d) the second acid being present in the amount of at least about 0.1 to about 0.5 weight percent;
- (e) the vanadium compound being present in the amount of at least about 0.01 weight percent; and
- (f) the solution having a maximum pH of about 3.

13. The composition claimed in claim 12 wherein the vanadium compound is selected from at least one member of the class consisting of vanadium pentoxide and vanadyl sulfate.

14. The composition claimed in claim 13 including at least from about 0.125 to about 0.5 weight percent glycerine.

15. The composition claimed in claim 12 wherein the second acid is hydroxymalonic acid.

16. The composition claimed in claim 13 wherein the second acid is hydroxymalonic acid.

17. The composition claimed in claim 14 wherein the second acid is hydroxymalonic acid.

18. The composition claimed in claim 14 wherein the primary acid is hydrochloric acid.

19. The composition claimed in claim 14 wherein the vanadium compound is vanadium pentoxide.

20. The composition claimed in claim 14 wherein the primary acid is hydrochloric acid and the second acid is hydroxymalonic acid.

21. The composition claimed in claim 20 wherein the vanadium compound is vanadium pentoxide.

22. The composition claimed in claim 21 including effective amounts of a wetting agent.

23. A process of removing sulfur scale from petroleum passages with the composition of claim 1 comprising treating the petroleum passages with the composition for a time and with sufficient amounts of the composition to remove the scale.

24. The process of removing sulfur scale from petroleum passages claimed in claim 23 wherein the petroleum passages are in petroleum bearing formations.

25. A process of removing sulfur scale from petroleum passages in petroleum bearing formations with the composition of claim 12 comprising treating the petroleum passages with the composition for a time and with sufficient amounts of the composition to remove the scale.

26. The process claimed in claim 25 wherein the vanadium compound is vanadium pentoxide.

27. The process claimed in claim 26 wherein the second acid is hydroxymalonic acid.

28. The process claimed in claim 27 wherein the petroleum bearing formation is dolomite.

29. The process claimed in claim 28 including in the composition at least from about 0.125 to about 0.5 weight percent glycerine.

* * * * *

UNITED STATES PATENT AND TRADEMARK OFFICE
CERTIFICATE OF CORRECTION

PATENT NO. : 4,213,866

DATED : July 22, 1980

INVENTOR(S) : Robert M. Ashby et al

It is certified that error appears in the above—identified patent and that said Letters Patent is hereby corrected as shown below:

In the specification: Column 2, line 5, "through" should be --thought--; Column 2, line 61, "that" should be --than--; Column 2, line 62, "shields" should be --acids--; Column 4, line 26, "$(Si_3O_3)$" should be --$(Si_3O_8)$--.

Signed and Sealed this

Twenty-eighth Day of October 1980

[SEAL]

Attest:

SIDNEY A. DIAMOND

Attesting Officer

Commissioner of Patents and Trademarks